United States Patent [19]

Wightman et al.

[11] 3,727,931
[45] Apr. 17, 1973

[54] PRECISION CHUCK

[75] Inventors: Lawrence W. Wightman, St. Louis; Thomas J. Long, Bridgeton, both of Mo.

[73] Assignee: Emerson Electric Co., St. Louis, Mo.

[22] Filed: Apr. 6, 1971

[21] Appl. No.: 131,662

[52] U.S. Cl. .................................. 279/62, 279/1 R
[51] Int. Cl. .................................... B23b 31/04
[58] Field of Search .................. 279/61, 62, 1 K, 279/60, 1 R

[56] References Cited

UNITED STATES PATENTS

| | | | |
|---|---|---|---|
| 1,532,328 | 4/1925 | McConnell | 279/62 |
| 3,311,384 | 3/1967 | Kawasaki | 279/62 |
| 3,463,048 | 8/1969 | Owsen | 279/1 R X |

Primary Examiner—Andrew R. Juhasz
Assistant Examiner—Z. R. Bilinsky
Attorney—Charles E. Markham

[57] ABSTRACT

A key-operated universal drill chuck having round elongated jaws slidably guided in forwardly converging bores arranged around a central axis in a chuck body, which jaws are slidably moved in their bores by a key-operated traverse nut having internal screw threads engaging screw thread sections formed on each jaw, the traverse nut being made adjustable along the body axis whereby the clearance between the engaging screw threads on the traverse nut and on the jaws may be adjusted to minimize rotational movement of the round jaws in their bores, and the chuck body further including a loosely fitting drive shaft receiving bushing cemented thereto precisely concentric and in alignment with a fixture cylinder gripped in the chuck jaws.

5 Claims, 7 Drawing Figures

PATENTED APR 17 1973
3,727,931
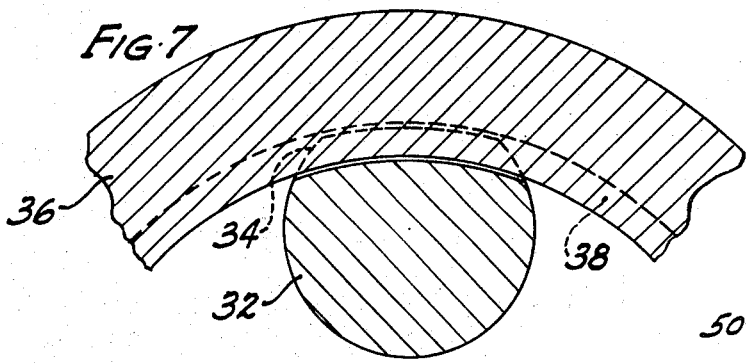
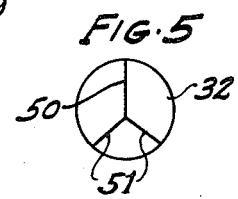
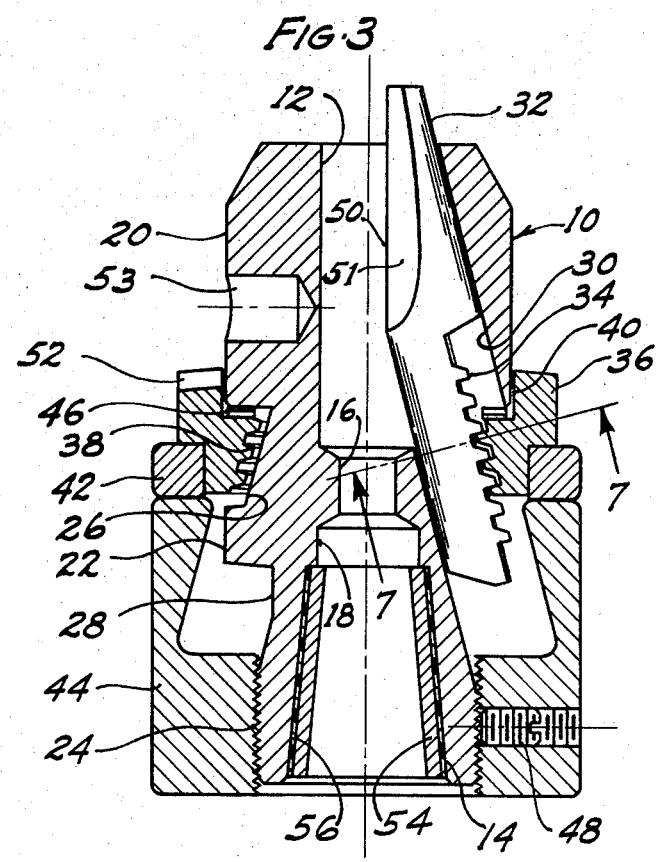
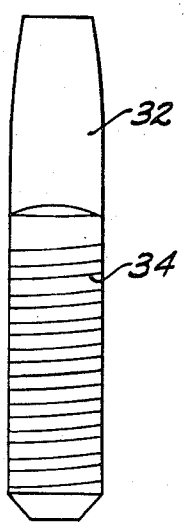
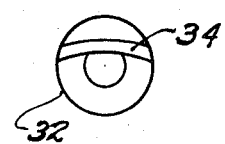
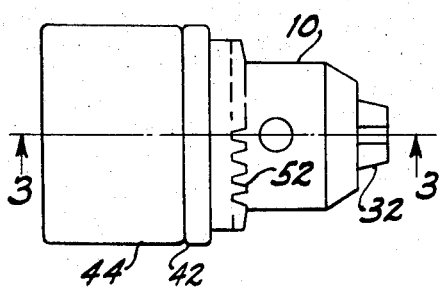
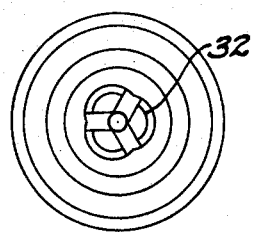
INVENTOR
LAWRANCE W. WIGHTMAN
THOMAS J. LONG
BY Charles E. Markham
THEIR AGENT

PRECISION CHUCK

This invention relates to universal drill chucks in which elongated round jaws slidably guided in forwardly converging bores in a chuck body are operated between open and closed positions by a key-operated traverse nut having internal screw threads engaging a screw thread section formed on each jaw. More particularly, the invention relates to means for converting mass produced chucks of this type with their usual manufacturing tolerance variations into precision chucks at a moderate cost.

In our earlier application, Ser. No. 99,546, filed Dec. 18, 1969, we disclosed a universal key-operated drill chuck in which a drive shaft receiving bushing is cemented in the body of an assembled chuck precisely in alignment and concentric with a fixture cylinder gripped in the chuck jaws. This provision insures the concentricity and alignment of a drive shaft with the shank of a drill or tool gripped in the jaws so long as the jaws are not permitted to rotate appreciably from their positions at the time of cementing the bushing in the body. The cross-sectional configuration of the forward portions of the jaws conventionally employed in the chucks of this type are sectors together forming a circle with a common center at the apex of their straight sides when completely closed and a drill or tool shank held in the jaws is engaged at the apexes of the jaws. It will be seen therefore than any appreciable rotation of one or more of the jaws will shift the center common to the apexes of their straight sides and will therefore shift the axis of a drill or tool shank held therein. When this occurs the axis of the drill or tool shank will no longer be precisely concentric with the axis of the cemented drive shaft bushing.

The jaws are conventionally restrained from rotational movement in their body bores only by engagement of the screw thread sections thereon with the interior screw threads of the traverse nut. It will be apparent therefore that the amount of rotational movement of the jaws which can occur is determined by the diametral fit of the screw threads on the jaws and the traverse nut. Because of slight dimensional variations which occur in the machining of the chuck body, the jaws, and the traverse nut, it is very difficult to hold the diametral clearance between the screw threads on the jaws and on the traverse nut to that which will preclude any appreciable rotation of the jaws and yet permit free non-binding operation of the jaws and traverse nut.

An object of this invention is to provide a generally new and improved key-operated universal drill chuck incorporating means by which a high degree of concentricity and alignment of a drive shaft on which the chuck is mounted and the shank of a tool gripped in the chuck jaws is consistently attained.

A further object is to provide means in a key-operated universal drill chuck to adjust the clearance between the screw threads on the chuck jaws and those on the traverse nut so as to preclude any appreciable rotation of the jaws.

Further objects and advantages will appear from the following description when read in connection with the accompanying drawing.

In the drawing:

FIG. 1 is a side elevational view of a key-operated universal drill chuck constructed in accordance with the present invention;

FIG. 2 is a front elevational view of the chuck shown in FIG. 1;

FIG. 3 is an enlarged longitudinal cross-sectional view of the chuck shown in FIGS. 1 and 2 and is taken along line 3—3 of FIG. 1;

FIG. 4 is a top elevational view of one of the chuck jaws shown alone;

FIG. 5 is a front end elevational view of the jaw shown in FIG. 4;

FIG. 6 is a rear end elevational view of the jaw shown in FIG. 4; and

FIG. 7 is an enlarged fragmentary cross-sectional view of one of the jaws shown in association with a portion of the traverse nut and is taken along line 7—7 of FIG. 3.

Referring to the drawing in more detail, the chuck comprises a round elongated body member 10 having an axial cylindrical bore 12 entering from its front end, an axial tapered bore 14 entering from its rear end, and smaller diameter bores 16 and 18 axially aligned with and connecting the bores 12 and 14. The body 10 is further characterized by a forward cylindrical portion 20, an intermediate cylindrical flange portion 22, a rear cylindrical screw threaded portion 24, a forward annular recess 26 between the forward cylindrical portion 20 and flange portion 22, and a rear annular recess 28 between the flange portion 22 and the rear screw threaded cylindrical portion 24.

Three longitudinal forwardly converging bores 30 of equal angular spacing about the body axis extend through the forward cylindrical body portion 20, the forward recessed portion 26, and the flange portion 22. The bores 30 each slidably receive a round elongated jaw member 32, each of which jaw members have sectional screw threads 34 extending across one side of the rear portion thereof. A round split traverse nut 36 entered into the body recess 26 is provided with internal screw threads 38 formed on a forwardly converging annular surface, which engage the sectional screw threads 34 on the forwardly converging jaws 32, so that as the traverse nut 36 is rotated, the jaws 32 are caused to move longitudinally in the forwardly converging bores 30.

The split traverse nut 36 is provided a counterbore 40 at the forward end thereof which receives the rear end portion of the forward cylindrical body portion 20. The rear portion of nut 36 is of reduced diameter and is slip fitted into a retaining ring 42. The two half circles of the split traverse nut are thereby retained in position to complete a circular nut. A hollow cylindrical member 44 having an internally screw threaded bore at its rear end threadedly engaged on the screw threaded rear cylindrical body portion 24 adjustably supports and takes the rearward thrust of the traverse nut retaining ring 42 at its forward end.

The traverse nut 36 is retained against axial movement in a forward direction by engagement of the bottom of its counterbore 40 with the shoulder at the forward end of recess 26 and against axial movement in a rearward direction by engagement of retaining ring 42 with the forward end of hollow cylindrical member 44. Between the bottom of the counterbore 40 in the traverse nut and the shoulder at the forward end of body recess 26, there is an annular resilient member 46 operative to bias the traverse nut 36 rearward against the forward end of member 44. The resilient member 46 may have any suitable form and is shown as a commercially available wavy spring washer. The member 44 takes the axial thrust when the jaws are tightened. As the member 44 is screwed forward on the body 10, the traverse nut 36 is moved forward and the resilient member 46 is compressed, and as the member 44 is screwed rearward, the traverse nut is urged rearward by the resilient member 46. The member 44 may be locked in any adjusted position by a traverse set screw 48.

It will be seen that as traverse nut 36 is moved axially rearward the tapered screw threads thereon will move radially inward with respect to the axes of tapered bores 30 and, consequently, the diametral clearance between the screw threads 38 thereon and the sectional screw threads 34 formed on the jaws 32 will be reduced. The fore end portions of the round elongated jaws 32 are each formed with a straight edge 50 on the side opposite the sectional screw threads 34, which edge is formed by converging flat surfaces 51. These straight edges 50 are inclined to the axis of the jaws and parallel to the axis of the chuck body. As the jaws 32 move slidably in the converging body bores 30, the straight edges 50 move radially and remain parallel to the axis of the chuck body. The forward end of the traverse nut 36 is provided with bevelled gear teeth 52, and a conventional chuck key (not shown) having a bevelled pinion gear and a pilot or journal pin adapted to be inserted in a hole 53 in the chuck body is employed to rotate the traverse nut.

Referring to FIG. 7, it will be seen that when the diametral clearance between the threads 34 and 38 of the jaws and traverse nut, respectively, is reduced, the rotational movement of jaws 32 relative to the traverse nut 36 which can occur is reduced. Obviously, some screw thread clearance is necessary to permit free movement of the jaws and traverse nut relative to the body and to each other. The amount of screw thread clearance required will depend chiefly upon the manufacturing tolerances permitted and to the extent that they may be cummulative in any individual chuck.

An internally tapered alignment bushing 54 is loosely fitted in the tapered bore 14 in the rear of the chuck body and is cemented therein by a cementing material 56. The internally tapered alignment bushing 54 is adapted to receive the similarly tapered end portion of a driving spindle or shaft. The relationship of the external dimension of the bushing 54 to that of the tapered body bore 14 is such as to provide sufficient annular space to permit appreciable tilting as well as lateral movement of the bushing in bore 14. The cementing material 56 is preferably an epoxy resin having a soft paste form in which it is applied to fill the annular space between bushing 54 and body bore 14 while permitting lateral and tilting movement of the bushing. The cement is also heat hardenable with negligible shrinkage and when hardened forms a rigid structural joint connecting the bushing to the chuck body.

ADJUSTMENT AND ASSEMBLY

When the chuck jaws, the traverse nut with its retaining ring, and the member 44 are assembled on the body member 10, the minimum screw thread clearance required on a particular chuck for free movement of the jaws and traverse nut through a selected range is predetermined by rotation of the traverse nut as screw thread clearance is varied by rotation of member 44. Rotation of member 44 in a direction to move it axially rearward on the body moves the traverse nut 36 rearward with it due to the bias of resilient washer 46. This rearward movement enters the screw threads of the traverse nut deeper into the screw threads formed on the chuck jaws and therefore reduces the diametral thread clearance. When the member 44 is rotated in an opposite direction the traverse nut 36 is moved axially forward, thereby increasing the diametral screw thread clearance and compressing the resilient washer 46. When the minimum allowable clearance has been determined, the member 44 is locked in adjusted position by set screw 48.

Having adjusted the screw thread clearance, the loosely fitting aligning bushing 54 is placed in the body bore 14 with the cement 56 filling the space between the bushing and the bore. The bushing is then positioned precisely in alignment and concentric with the axis of a cylinder of predetermined diameter gripped in the chuck jaws 32 and is held in this position while the cement 56 is heat hardened. To facilitate positioning and holding the bushing 54 concentric and in alignment with the axis of the cylinder held in the chuck jaws, a fixture is employed having a first portion precisely fitting the interior of tapered bushing 54 and a second cylindrical portion precisely concentric and in alignment with the first portion and adapted to be gripped in the chuck jaws.

The hole 53 for journalling the operating key may be drilled after the traverse nut is adjustably positioned.

We claim:

1. In a key-operated universal drill chuck in which elongated generally round jaws slidably guided in forwardly converging bores in a chuck body and arranged around the longitudinal axis thereof are adapted to converge forwardly and grip a tool at the forward end of the body, and in which the jaws and a surrounding traverse nut mounted for rotation and axial movement with respect to the chuck body have engaging screw threads formed on surfaces thereof paralleling the axes of said jaws, whereby rotation of said nut in one direction effects forward axial movement of said jaws when rearward axial movement of said nut is prevented and whereby engagement of said jaw threads with said nut threads limits rotation of said jaws in their bores; the improvement which consists in providing axially adjustable abutment means on said chuck body for adjustably limiting rearward axial movement of said rotatable traverse nut on said body thereby to vary the diametral clearance between the screw threads on said jaws and on said traverse nut, and means for locking said abutment means in an adjusted position.

2. The device claimed in claim 1 which includes resilient means biasing said traverse nut rearwardly against said adjustable abutment means.

3. The device claimed in claim 1 in which said axially adjustable abutment means comprises an annular member threadedly adjustable on said chuck body and said locking means comprises a transverse set screw in said annular member.

4. A universal drill chuck in which a split traverse nut mounted for rotation and axial movement on a chuck body surrounds and threadedly engages a plurality of generally round elongated chuck jaws, said chuck jaws being slidable in forwardly converging bores in said chuck body, and said jaws and said nut having engaging screw threads formed on surfaces thereof parallel with the axes of said converging bores, a retaining ring slip fitted on said split traverse nut, an abutment member axially adjustable on said chuck body and having a forward facing transverse surface adapted to abut a rearward facing surface on said retaining ring thereby to variably limit rearward axial movement of said nut, an axially extending annular surface on said traverse nut closely surrounding a cylindrical portion of said chuck body, thereby to maintain said nut concentric with the axis of said chuck body, and resilient means acting between a rearward facing surface on said body and a forward facing surface on said traverse nut to bias said nut rearward against said axially adjustable abutment member whereby axial adjustment of said abutment member on said body effects the axial positioning of said traverse nut.

5. In a key-operated universal drill chuck in which elongated generally round jaws slidably guided in forwardly converging bores in a chuck body and arranged around the axis thereof are adapted to converge forwardly and grip a tool at the forward end of the body, and in which the jaws and a surrounding traverse nut mounted for rotation and axial movement with respect to the chuck body have engaging screw threads formed on surfaces thereof paralleling the axes of said converging body bores, whereby rotation of said nut in one direction effects forward axial movement of said jaws when rearward axial movement of said nut is prevented and whereby engagement of said jaw threads with said nut threads limits rotation of said jaws in their bores; the improvement which consists in the provision of axially adjustable abutment means on said body member for limiting rearward axial movement of said rotatable traverse nut, and means for locking said axially adjustable member in adjusted position thereby to vary the diametral clearance between the screw threads on said jaws and on said traverse nut, and in the provision of a rigid alignment member having an axially extending portion adapted to interfit with a driving shaft and an axially extending annular surface loosely fitted into an axial bore entering the rear end of said chuck body and being cemented therein with said axially extending annular surface precisely concentric and in alignment with a cylindrical member gripped in said jaws.

* * * * *